United States Patent [19]
Van De Motter et al.

[11] Patent Number: 4,477,216
[45] Date of Patent: Oct. 16, 1984

[54] INFEED SHUTTLE TABLE FOR VERTICAL BROACH

[75] Inventors: Charles P. Van De Motter; Steven J. Hamm; Christopher C. Van De Motter, all of Cuyahoga County, Ohio

[73] Assignee: The Ohio Broach & Machine Company, Willoughby, Ohio

[21] Appl. No.: 342,674

[22] Filed: Jan. 26, 1982

[51] Int. Cl.³ .................. B23D 37/12; B23D 41/06
[52] U.S. Cl. .................................. 409/257; 409/274; 409/277
[58] Field of Search ............... 409/224, 256, 257, 274, 409/276, 277, 278, 269, 270, 271, 281, 283

[56] References Cited

U.S. PATENT DOCUMENTS

| | | | |
|---|---|---|---|
| 2,190,067 | 2/1940 | Hart | 409/283 |
| 2,385,119 | 9/1945 | Welte | 409/283 |
| 2,813,462 | 11/1957 | Bonnafe | 409/274 |

OTHER PUBLICATIONS

Workshop and Factory ("Werkstatt und Betrieb"), Sep. 1968, No. 9, pp. 3–6.
RAS: The New Range of Hydraulic Vertical Surface Broaching Machines, issued by Oswald Forst GmbH., Solingen, Federal Republic of Germany.

*Primary Examiner*—Z. R. Bilinsky
*Attorney, Agent, or Firm*—Biebel, French & Nauman

[57] ABSTRACT

A broaching machine has a broach carrying ram mounted for reciprocating movement in a vertical path through a downward cutting stroke and an upward return stroke. A work holding table has a support plate on its upper surface receiving a part holding fixture thereon to hold parts in position for cutting by said tool, and the lower surface of said table has a pivot mounting to the machine base. Horizontal shuttling movement of said plate toward and away from the ram path is provided by a cam block movable transversely in said table and having a cam slot extending at an angle to the path of movement of the cam block. A cam follower is attached to the underside of the table and extending into said cam slot, and pistons are arranged in the table to reciprocate the cam block. The cam slot extends at an acute angle to the path of the cam block. A cylinder and latching linkage is connected for tilting said table between a cutting position with the plate horizontal and normal to the ram path and a loading position with the plate tilted upward and away from the ram path.

6 Claims, 10 Drawing Figures

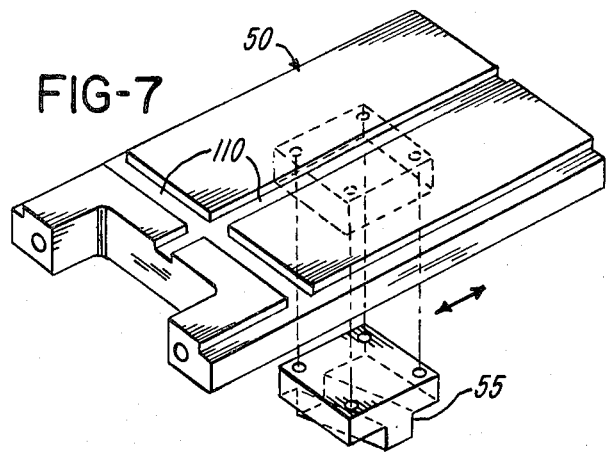
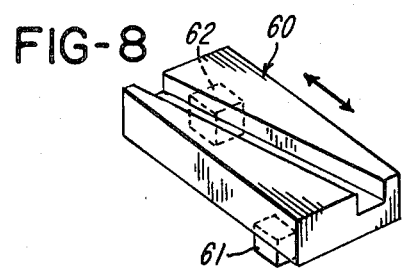
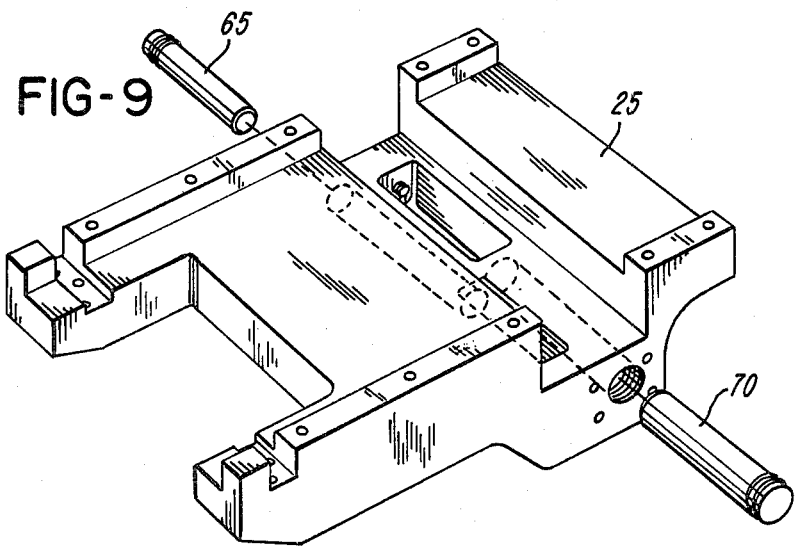

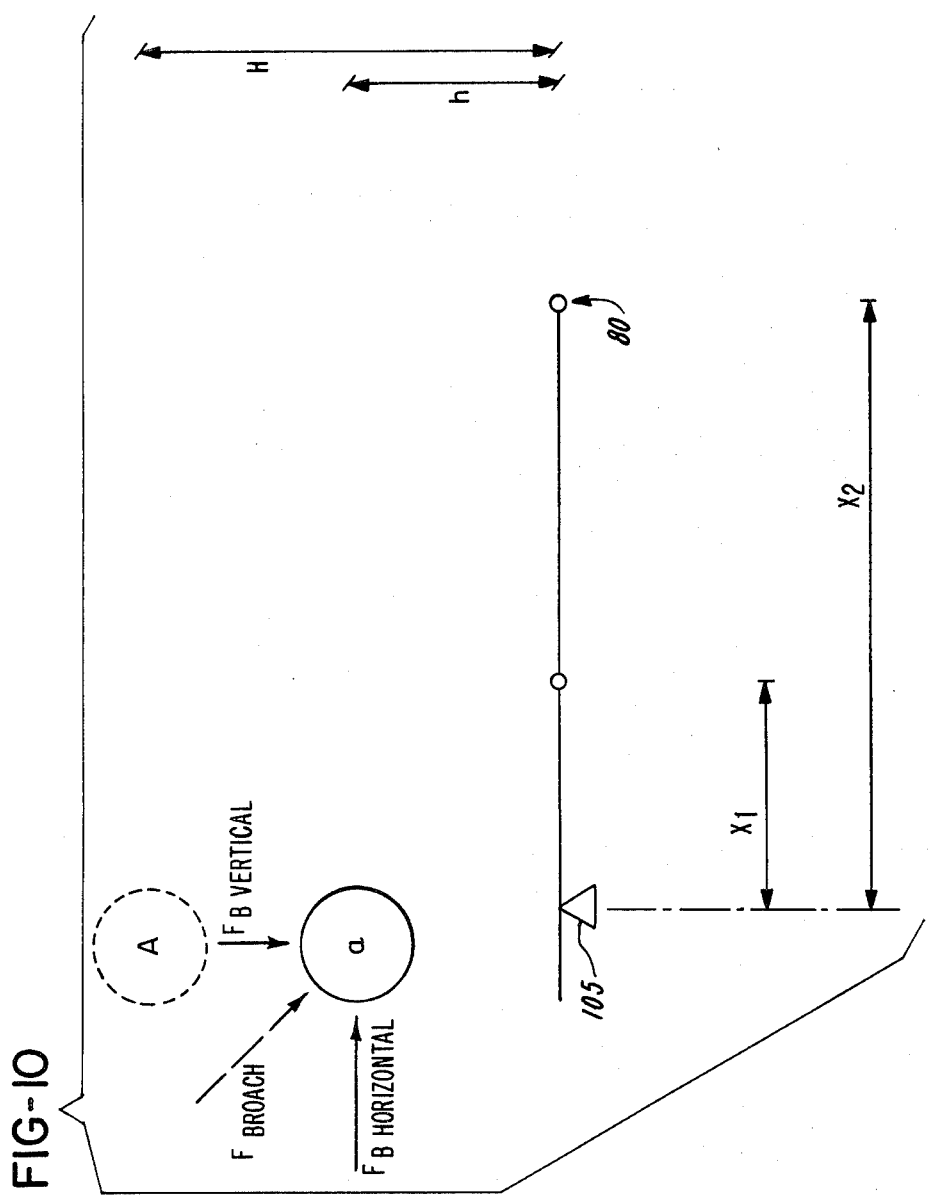

INFEED SHUTTLE TABLE FOR VERTICAL BROACH

BACKGROUND OF THE INVENTION

This invention relates to improvements in machining tools and in particular to improvements of broaching machines. Broaching machines use a tool which gradually cuts away pieces of a material in a very fast and efficient process. The broaching machine requires less time than a comparable boring, milling, and finishing of an aperture and also attains a relatively equal precision. The broaching process requires the article or workpiece to be secured to a support table in a stable manner so a broaching tool, attached to the ram, can proceed in a perpendicular direction with respect to the supporting table and cut a slot in the workpiece.

The tool used is a long member with a number of cutting teeth of about the same width, arranged in a tapered fashion, shallow teeth to deep cutting teeth. The shallowest of the cutting teeth engages with the article first initiating the cutting and then succeedingly deeper cutting teeth pass through the article with each tooth removing a little more of the workpiece. The ram holding the broaching tool makes a cutting stroke in a downward fashion through the workpiece, driven with great force by a hydraulic ram which applies a steady and smooth cutting stroke.

Typically in broaching a deep slot or form with a broach machine of this type, a means for advancing the work (i.e. the article to be broached) in increments toward the ram allows the article to be worked upon in progressive stages. After the article is advanced forward, it is held in position and the broaching tool makes a downward cutting stroke. If more material is to be cut away, the article is withdrawn away from the ram, the broaching tool ascends with the slide, the article again is moved forward by one increment, and the broaching tool descends for a second cut, and so on. A sensing means determines when the article is finished, at which time it is withdrawn and tilted up ready for unloading and loading of a new article, and the broaching tool returns to its original top position.

Previously the combination of the tooling for securing the article or workpiece and the support structure for producing the shuttling action, and the tilting motion resulted in the workpiece being mounted high above the table. This prior configuration allowed horizontal force components produced by the cutting action coupled with a substantial height above the hinge point to create a moment around the hinge point producing a tilt back reaction in the table. The present invention uses a movable shuttle support incorporated in the table, allowing the tooling to secure a workpiece closer to the table surface. By mounting the work piece or article closer to the table, less moment is exerted around the hinge point.

SUMMARY OF THE INVENTION

The present invention is an improvement to such a conventional broaching machine. One of the objects of this tilt support table is to allow easy loading and unloading of the workpieces. Another object of this invention is to decrease the height of the workpiece above the support table without any loss of functionality over the prior art. The means for shuttle movement is implanted in the table and moves the workpiece toward and from the ram. In this fashion the broaching tool cuts away sections at a time. The table also uses a proximity switch to indicate whether the table has reached its most forward position.

Other objects and advantages of the invention will be apparent from the following description, the accompanying drawings and the appended claims.

BRIEF DESCRIPTION OF THE DRAWINGS

FIGS. 7-9 are exploded perspective views of the means for causing shuttle movements of the table top;

FIG. 10 is a schematic view of the tilt support table and the position of the workpiece comparing the prior art location and that in the present invention.

DESCRIPTION OF THE PREFERRED EMBODIMENT

Figure 1:
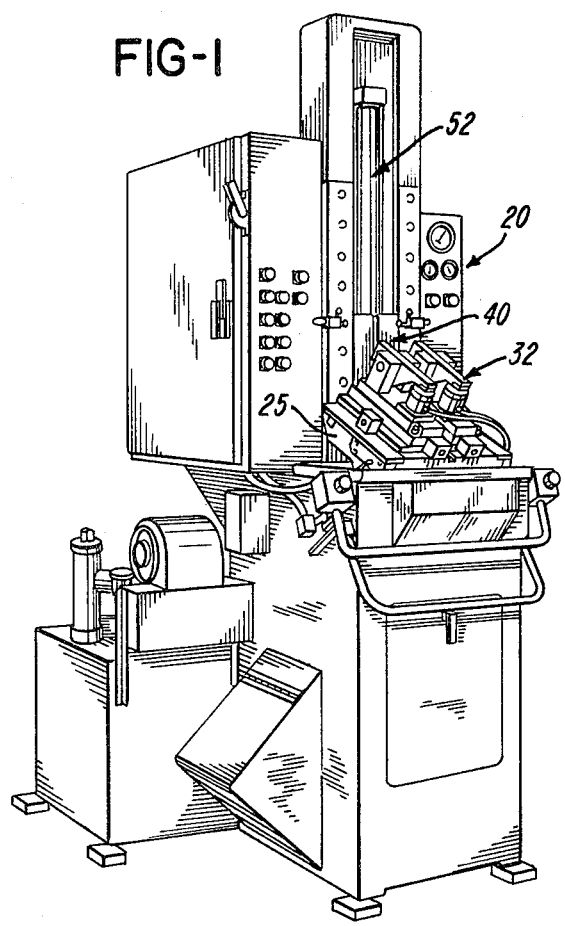
FIG. 1 is a perspective view of a broaching machine.
Figure 3:
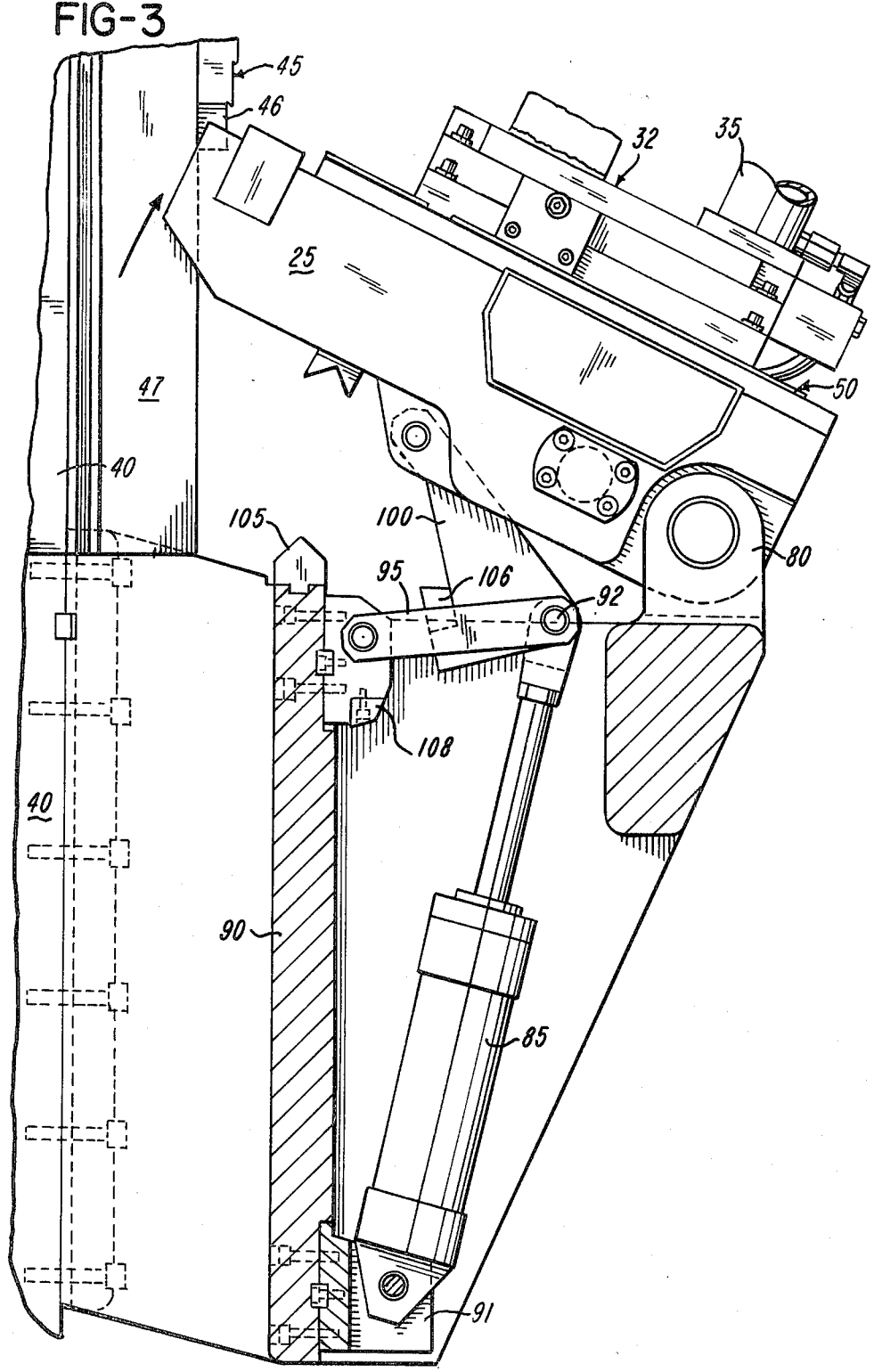
FIG. 3 is a side cross sectional view of the table in a tilted position, specifically illustrating the extension of the hydraulic cylinder.

The broaching machine 20 as pictured in FIGS. 1 and 3 has the table 25 shown in the tilted position, up and back from the ram path. In this position the machine attendant can load a workpiece 30 into a suitable clamping fixture 32 on the table, securing the piece tightly with a hydraulic clamp 35 or similar device to prevent the workpiece from any undesired movement. The surface of the article to be cut is thus placed near the front edge of the table 25 that faces the ram slide 40, or near the upper edge of the tilt table as shown in this view. Once the workpiece is secured the support table 25 is lowered to its horizontal position where the article can be cut by the broaching tool 45.

The broaching tool 45 is attached to a ram 47 and travels in a vertical direction along the ram slide 40, being driven in conventional manner by a hydraulic cylinder 52. As the tool 45 descends with the ram slide 40, the secured workpiece 30 is cut along its edge. The narrowest teeth engage the workpiece 30 initially and each succeeding tooth cuts away a further chip as the tool 45 descends. The teeth gradually increase in depth, thus cutting larger and larger sections from the workpiece until the broaching tool has completed its downward cutting stroke through the article. In many instances multiple passes of the tool are needed to complete the cut to the desired depth. Thus, on the ram at the lower edge of tool 45 there is a bar 46 having a width slightly less than the width of the teeth of the tool. When the ram is in its elevated position, bar 46 is located so as to be touched by a workpiece being held in the fixture, specifically, the area to be removed from the workpiece as it is advanced into the tool path. For example, if the total amount of material to be removed in a given job (e.g. the required depth) is greater than what can be removed with one pass of the tool, the workpiece may be moved toward and away from bar 46 as the tool makes several cutting strokes. The incomplete slot will bottom against bar 46 and stop the infeed motion of the workpiece and table, holding that position for the next cut, until the required full depth of cut is achieved.

FIGS. 7, 8 and 9 illustrate in exploded form the means for moving the slide plate 50 in the table top in a shuttle-like manner toward and away from the ram slide 40. Particularly, FIG. 7 is a view of the table plate 50 showing an angled block or key 55 fastened to the bottom of the table top. The angled block 55 acts as a cam follower that shuttles within the cam 60 illustrated in FIG. 8. The cam 60 has an angled slot across its top surface into which the cam follower 55 rests and the bottom surface has a pair of integral downward extending tongues 61 and 62. These tongues, 61 and 62, are also shown separated from the cam 60 in FIG. 6 and are acted on by two pistons 65, 70. Piston 65, when extended, will force the cam 60 to the right which in turn moves the table top 50 to the left toward the ram slide 40. If piston 70 is extended the cam 60 is pushed to the left and the table top plate 50 proceeds to the right, away from the ram slide 40. A proximity switch 75 (FIG. 5) is utilized to indicate whether the plate 50 can proceed any closer to the ram slide 40. If this switch is actuated the broaching tool 45 will make a final downward cutting stroke, the plate will then recess out, and the table will tilt up for unloading.

The angle of the cam slot in cam block 60 is acute, in the order of 11.5° to 12°, so there is substantial advantage in the cam-follower mechanism resisting the thrust of the broaching tool against the work. This allows the piston 65 to withstand the resultant of such thrust, using a reasonable hydraulic pressure, for example in the order of 200 p.s.i. Piston 70 is somewhat larger, to assure adequate force is available to overcome any self-locking tendancy of the cam and follower, in order to retract the table away from the broach.

Figure 2:
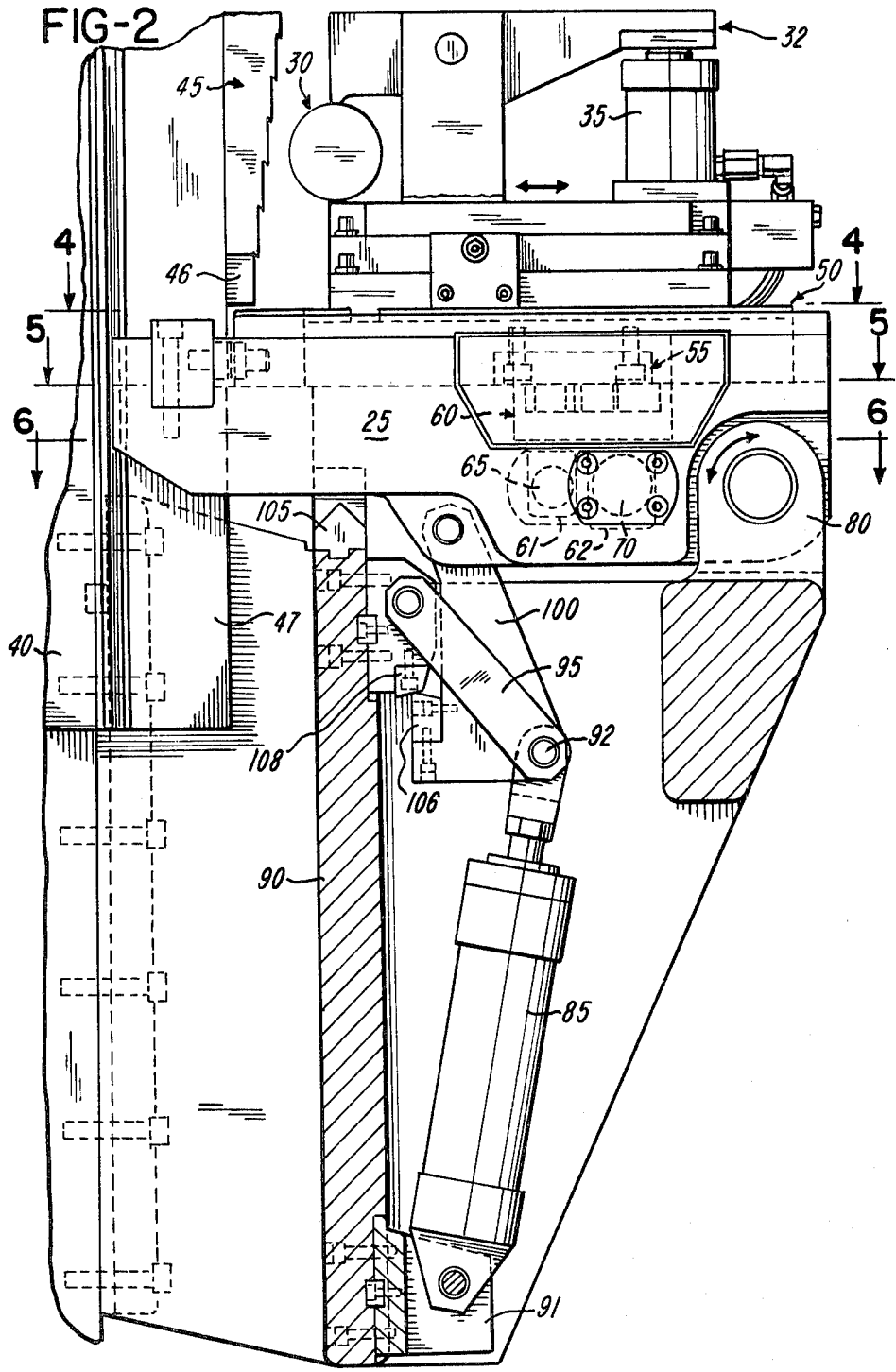
FIG. 2 is a side cross-sectional view of the tilt table in a retracted position specifically showing the hinge, hydraulic tilt cylinder, wedge clamping, and connecting linkage.

FIG. 2 is a cross-sectional view of the tilt support table 25 illustrating the table in a horizontal position. The hinge 80 is located below the support surface 25 at a position farthest from the ram slide 40, to the right hand side in this view. A hydraulic piston 85, in its retracted position connects to a stationary wall 90 at its base 91 and to the pivot pin 92 between two links 95 and 100. Link 95 has one end connected to the pin 92 and the other end pivotally connected to the aforementioned stationary wall 90. Link 100 also has one end connected to the pin 92 and its opposite end pivotally attached to the bottom side of the support table 25. When the table 25 is horizontal the piston 85 and links 95, 100 assume the configuration as shown and the front of the table rests on an inverted V block 105. The hardened pad 106, bolted to block 100, locks under the hardened pad 108 which is bolted to the pivot support for link 95. These parts thus latch the linkage when the table is horizontal.

A tilted position of the support table 25 is shown in FIG. 3. The hydraulic piston 85 is extended and brings link 95 to a substantially horizontal position. Link 100 is now a support member of the table 25 as the table rotates in a clockwise direction about the hinge 80 as illustrated by the arrow. The top surface of the tilt table 25 is angled away from the ram slide 40 and allows a machine user to load or unload a workpiece 30.

Figure 4:
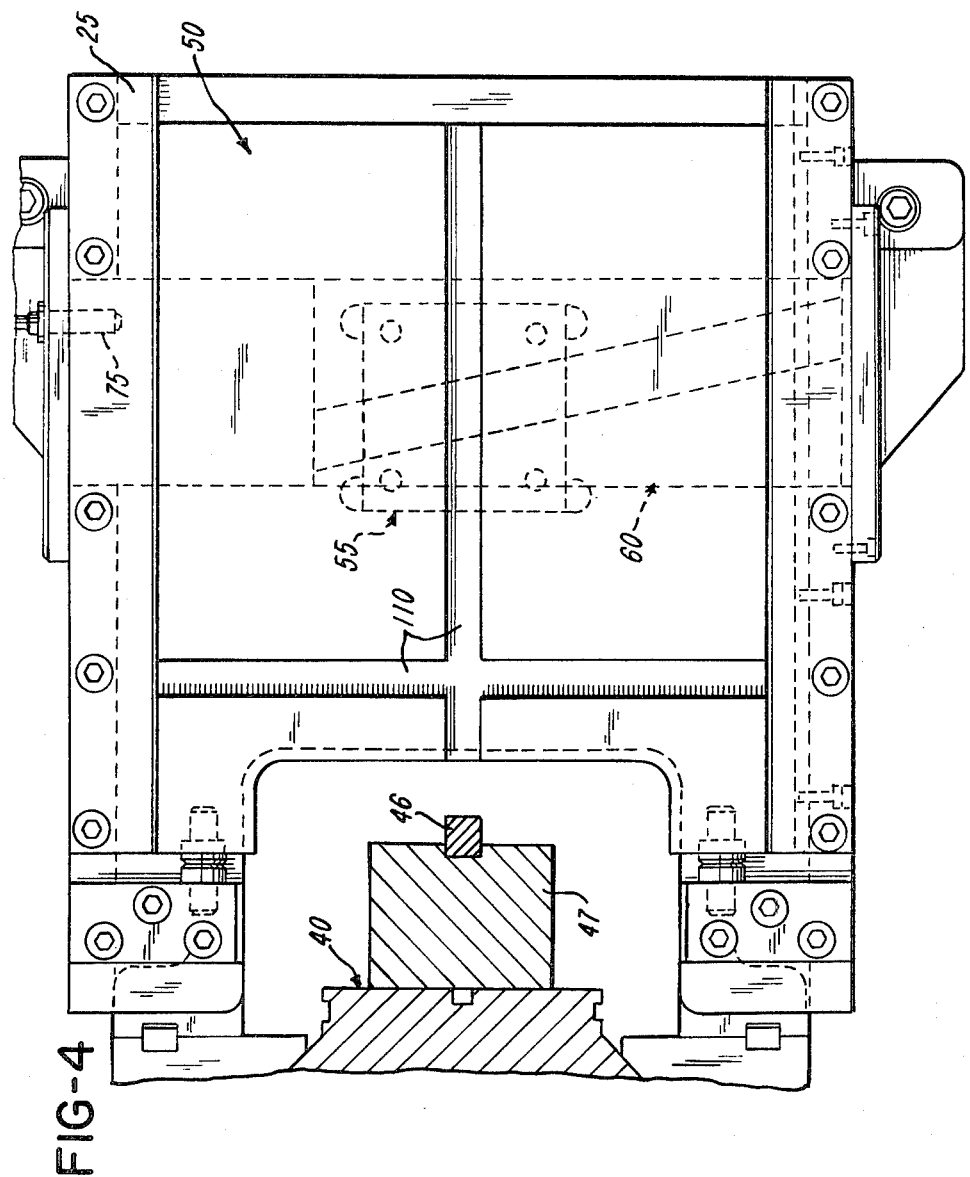
FIG. 4 is a plan view illustrating the table surface.
Figure 5:
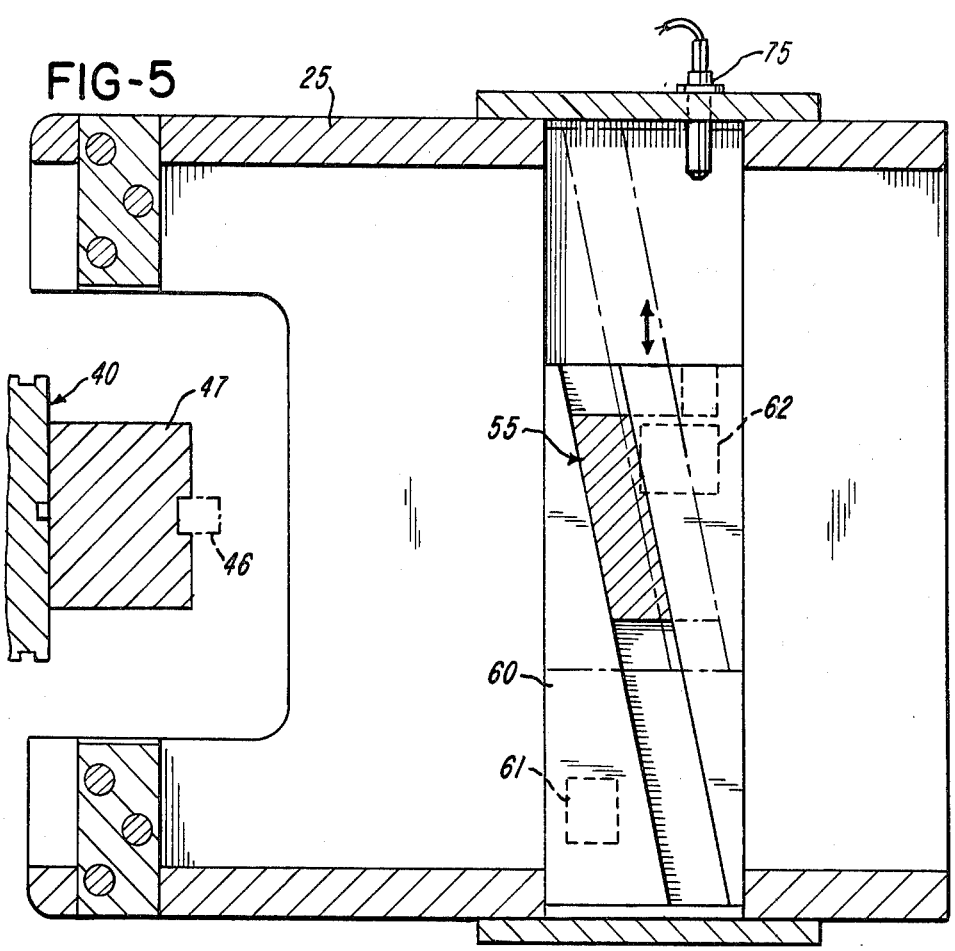
FIG. 5 is a cross-sectional view of the tilt support table taken along the line 5—5 of FIG. 2.
Figure 6:
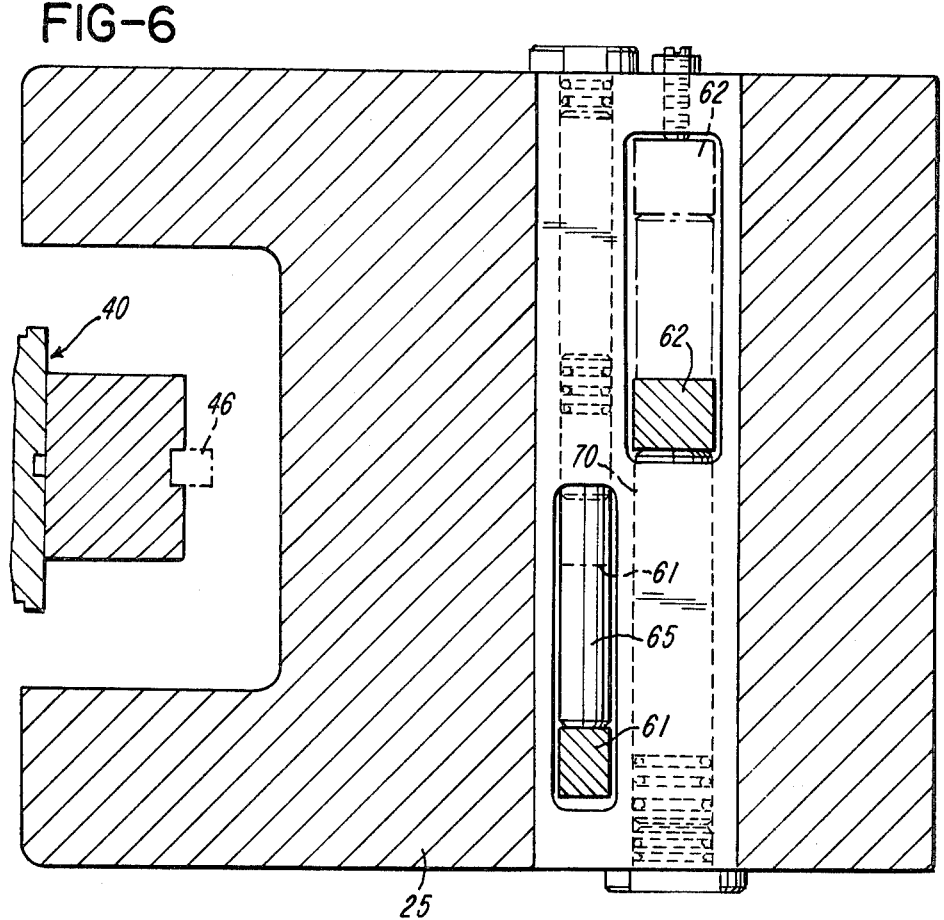
FIG. 6 is a cross-sectional view along the line 6—6 of FIG. 2 further showing the location of the internal shuttle control pistons.

FIGS. 4, 5 and 6 are cross-sectional views looking through the table and further illustrating the table shuttle means. FIG. 4 shows the top surface of the support table 25. A pair of perpendicularly intersecting keyways 110 are necessary to locate a fixture 32 to the table and position the workpiece 30 close to the table surface. In the past some form of shuttling mechanism was mounted to the top of the support table surface 25, which placed the workpiece 30 a great distance above the table. By inserting the cam 60 and pistons 65, 70 below the surface as shown in FIGS. 6 and 9, the workpiece 30 is brought closer to the table surface 50 while the table retains the required movement toward and away from the ram slide.

FIG. 10 particularly illustrates the major difference between the present invention and the prior art. In prior art machines a workpiece A is typically secured at a height H above the support table. The present invention secures a like workpiece a at a lesser height h above the table, and still incorporates the shuttle mechanism. Also the hinge point is further moved back from the tool (to the right in FIG. 2), for example from a typical prior location at distance X1 from the V block 105 to a distance X2, the spacing of the hinge 80 from V block 105. As the broaching tool passes in its downward stroke and engages the side of the workpiece, a substantial of force is exerted against the support table. As the diagram shows, the force exerted by the broaching tool can be represented as two components of force, $F_{B\ Vert.}$ and $F_{B\ Horiz.}$. By latching the table in its horizontal (cutting) position, using parts 106, 108 on the table lifting linkage, and by moving the hinge point outward from the ram as explained, and by lowering the part closer to the table, the stability of the table is substantially improved, while adequate tilting/withdrawing motion of the fixture is available for ease of loading and unloading.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a broaching machine having a base,
   a ram mounted on said base for reciprocating movement in a vertical path through a downward cutting stroke and an upward return stroke,
   means for mounting a broaching tool on said ram,
   a table having a support plate on its upper surface adapted to receive at least one part holding fixture thereon to hold parts in position for cutting by said tool,
   means attached to the lower surface of said table forming a pivot mounting on said base for said table, said pivot mounting means including a hinge pin located on an axis under the edge of said table farthest from said ram path, and means providing for horizontal movement of said plate toward and away from said vertical path of said ram,
   said plate including means for receiving the fixture in close proximity to said table, and
   means for tilting said table between a cutting position with said plate horizontal and normal to said ram path and a loading position with said plate tilted upward and away from said ram path.

2. A broaching machine as defined in claim 1, wherein said means for horizontal movement of said plate includes,
   a cam block movable transversely in said table and having a cam slot extending at an angle to the path of movement of said cam block,
   a cam follower attached to the underside of said table and extending into said cam slot, and said means for providing movement of said plate includes piston means arranged to reciprocate said cam block and thereby to cause movement of said plate toward and away from the ram path.

3. A broaching machine as defined in claim 2, wherein said cam slot extends at an acute angle to said path of said cam block sufficient to reduce the force required to hold said cam follower in said cam slot against the force of a tool cutting a workpiece.

4. A broaching machine as defined in claim 1, wherein said means for tilting said table includes linkage connecting said table to said base at a location spaced from said pivot mounting.

5. A broaching machine as defined in claim 4, wherein said linkage is located adjacent said ram path.

6. A broaching machine as defined in claim 4, wherein said linkage includes latching mechanism for latching said table in horizontal position.

* * * * *